United States Patent [19]

Atsuta

[11] Patent Number: 5,920,144
[45] Date of Patent: *Jul. 6, 1999

[54] VIBRATING ACTUATOR DEVICE

[75] Inventor: Akio Atsuta, Yokosuka, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/541,096

[22] Filed: Oct. 11, 1995

[30] Foreign Application Priority Data

Oct. 17, 1994 [JP] Japan .................................. 6-250617

[51] Int. Cl.⁶ .................................................. H01L 41/08
[52] U.S. Cl. .......................................... 310/316; 318/116
[58] Field of Search ..................................... 310/316, 323; 318/116

[56] References Cited

U.S. PATENT DOCUMENTS

| | | | |
|---|---|---|---|
| 4,713,571 | 12/1987 | Suzuki et al. | 310/316 |
| 4,743,788 | 5/1988 | Takagi et al. | 310/316 |
| 4,833,358 | 5/1989 | Suzuki et al. | 310/316 |
| 4,888,514 | 12/1989 | Takahasi et al. | 310/316 |
| 5,001,404 | 3/1991 | Kataoka | 318/116 |
| 5,130,619 | 7/1992 | Izuno | 318/116 |
| 5,153,486 | 10/1992 | Hirotomi | 318/116 |
| 5,173,631 | 12/1992 | Suganuma | 318/116 X |
| 5,192,889 | 3/1993 | Myoha | 310/316 |
| 5,231,325 | 7/1993 | Tamai et al. | 310/323 |
| 5,233,274 | 8/1993 | Honda et al. | 318/116 |
| 5,365,139 | 11/1994 | Kasuga et al. | 310/316 |
| 5,448,128 | 9/1995 | Endo et al. | 310/323 |
| 5,477,099 | 12/1995 | Suganuma | 310/316 |
| 5,563,478 | 10/1996 | Suganuma | 318/116 |
| 5,612,598 | 3/1997 | Fukui et al. | 318/116 |
| 5,616,979 | 4/1997 | Nishikawa | 310/316 |

FOREIGN PATENT DOCUMENTS 3-289375  12/1991  Japan .

*Primary Examiner*—Mark O. Budd
*Attorney, Agent, or Firm*—Fitzpatrick, Cella, Harper & Scinto

[57] ABSTRACT

In a vibrating actuator device, a driving force is obtained by applying AC signals having different phases to first and second electromechanical energy transducers disposed in a vibrator. The state of driving of the device is determined by comparing the value of a voltage of the AC signal in the first electromechanical energy transducer with the value of a voltage of the AC signal in the second electromechanical transducer.

11 Claims, 9 Drawing Sheets

VIBRATING ACTUATOR DEVICE

BACKGROUND OF THE INVENTION

1. Field of the Invention

This invention relates to a vibrating driven motor (an oscillatory-wave-motor).

2. Description of the Related Art

For a long time the assignee of the present application has practically utilized a vibration driven motor (an oscillatory-wave-motor), in which surface-acoustic-wave vibration is generated on the surface of a vibrator, by piezoelectric elements and the like, and vibrational energy of the vibrator is converted into a continuous mechanical movement. The vibration driven motor has been used a driving motor for an optical apparatus, such as a camera or the like. Various kinds of vibration driven motors have different power-generation principles and mechanical structures, and various kinds of vibration driven motors have been developed and practically utilized by the assignee of the present application.

A description will now be provided of a bar-shaped vibrating motor developed by the assignee of the present application and mounted in a conventional optical apparatus relating to the present invention.

FIGS. 9 and 10 illustrate the mechanical structure and the electrical configuration of the bar-shaped vibration driven motor, respectively.

In FIG. 9, vibrator 101 of the vibration driven motor is formed by inserting groups of circular piezoelectric elements, serving as electromechanical energy transducers, in intermediate portions of the main body of the vibrator 101, comprising a thick metallic cylindrical member. By applying AC voltages having different phases to the respective groups of piezoelectric elements, local elliptical vibration is generated at a distal-end surface of the vibrator 101. The piezoelectric elements inserted in the main body of the vibrator 101 comprise a group of A-phase piezoelectric elements and a group of B-phase piezoelectric elements to which a first voltage and a second voltage are applied, respectively, in order to generate the elliptical vibration at the distal-end portion of the vibrator 101, and a group of piezoelectric elements S, serving as mechanoelectrical energy transducers, for detecting the state of vibration of the vibrator 101.

A rotating member (rotor) 102 is rotated by the surface-acoustic-wave vibration at a distal-end surface of the vibrator 101 by being subjected to pressure contact therewith. An output gear 103 is connected to the rotating member 102.

Since the principle of operation of such a vibration driven motor has been disclosed, for example, in Japanese Patent Laid-Open Application (Kokai) No. 3-289375 (1991), a description thereof will be omitted.

The group of A-phase piezoelectric elements comprises two piezoelectric elements a1 and a2, the group of B-phase piezoelectric elements comprises two piezoelectric elements b1 and b2, and the group of piezoelectric elements S for detecting vibration comprises a single piezoelectric element s.

A grounding electrode GND-d is in tight contact with the outer surface of the piezoelectric element a1. A driving electrode A-d for applying the first AC voltage for driving is inserted between the piezoelectric elements a1 and a2. A grounding electrode GND-d is inserted between the piezoelectric elements a2 and b1. A driving electrode B-d for applying the second AC voltage for driving is inserted between the piezoelectric elements b1 and b2. A grounding electrode GND-d is inserted between the piezoelectric elements b2 and s. An electrode S-d for detecting vibration is in tight contact with the outer surface of the piezoelectric elements.

That is, each of the two pairs of piezoelectric elements, a1 and a2, and b1 and b2 is inserted between the grounding electrodes GND-d. An A-phase driving signal (to be described later) is applied to the piezoelectric elements a1 and a2 via the driving electrode A-d present therebetween, and a B-phase driving signal (to be described later) is applied to the piezoelectric elements b1 and b2 by the driving electrode B-d present therebetween. The vibration of the piezoelectric element s is detected by the electrode S-d for detecting vibration. As shown in FIG. 9, an insulating sheet 104 is attached to the-other distal-end surface of the main body of the vibrator 101 in order to prevent the electrode S-d from being electrically grounded.

FIG. 10 illustrates the schematic configuration of driving control means for applying AC voltages, serving as driving signals, to the A-phase piezoelectric elements a1 and a2 and the B-phase piezoelectric elements b1 and b2.

In FIG. 10, a microprocessor 11 constitutes frequency control means for setting and changing the frequency of the AC voltages to be applied to the group of A-phase piezoelectric elements (in FIG. 10, the piezoelectric elements a1 and a2 are represented by a single element) and the group of B-phase piezoelectric elements (in FIG. 10, the piezoelectric elements b1 and b2 are represented by a single element). An oscillator 2 is a known voltage controlled oscillator (VCO) or the like for generating an AC signal having a frequency corresponding to an instruction signal generated from the microprocessor 11. Reference numeral 3 represents a known phase shifter for shifting the phase of the output signal of the oscillator 2 by a predetermined amount (for example, 90 degrees). Switching circuits 4 and 5 comprise, for example, push-pull amplifying circuits for amplifying the outputs of the oscillator 2 and the phase shifter 3 by switching the voltage of a high-voltage power supply with the output of the oscillator 2 and the phase shifter 3, respectively. Matching coils 6 and 7 match the impedance of the driving control means side with the impedance of the vibrator side. A phase-difference detector 10 detects the difference between the phase of a voltage signal generated by the piezoelectric element s for detecting vibration and the phase of the A-phase driving signal applied to the A-phase piezoelectric elements.

The driving control means, including the microprocessor 11 and the other above-described circuits, drives the vibration driven motor both when starting the vibrating motor and during a steady-state operation. The microprocessor 11 recieves the output of the phase-difference detector 10 and uses that information to control the frequency of the A-phase driving signal and the B-phase driving signal.

SUMMARY OF THE INVENTION

It is an object of the present invention to provide a vibrating actuator device in which its state of vibration can be determined without providing an electromechanical energy transducer for detecting the state of vibration.

It is another object of the present invention to provide a vibrating actuator device which determines its state of vibration by obtaining the relationship between respective characteristics (e.g., voltage and current) of AC signals applied to first and second electromechanical energy transducers in the respective transducers.

It is still another object of the present invention to provide a vibrating actuator device which performs appropriate driving by controlling the frequency of AC signals applied to first and second electromechanical energy transducers by obtaining the relationship between respective characteristics (e.g., voltage and current) of the AC signals in the respective transducers.

It is yet another object of the present invention to provide a vibrating actuator device which prevents abrupt stoppage of driving of the device at a frequency lower than the resonance frequency of the device by controlling the frequency of AC signals applied to first and second electromechanical energy transducers by obtaining the relationship between respective characteristics (e.g., voltage and current) of the AC signals in the respective transducers.

According to one aspect, the present invention, which achieves these objectives, relates to a vibrating actuator device for obtaining a driving force by exciting a vibrator by applying AC signals to a first electromechanical energy transducer unit and a second electromechanical energy transducer unit, comprising an AC-signal forming circuit for forming the AC signals, and determination means for determining a driving state of the device based on a relationship between characteristics of the AC signal in the first energy transducer unit and characteristics of the AC signal in the second energy transducer unit.

According to another aspect, the present invention relates to a vibrating actuator device for obtaining a driving force by exciting a vibrator by applying AC signals to a first electromechanical energy transducer unit and a second electromechanical energy transducer unit, comprising an AC-signal forming circuit for forming the AC signals, and a frequency control circuit for controlling a frequency of the AC signals based on a relationship between characteristics of the AC signal in the first energy transducer unit and characteristics of the AC signal in the second energy transducer unit.

According to still another aspect, the present invention relates to a vibrating actuator device a vibrator, the device comprising first and second groups of energy transducers for generating mechanical vibration by applying electrical energy thereto, and vibrating in a first vibration mode by being excited by the first group of transducers and vibrating in a second vibration mode by being excited by the second group of transducers, driving control means for applying a first AC voltage to the first group of transducers and a second AC voltage, different from the first AC voltage only in its phase, to the second group of transducers, frequency control means for setting and changing a frequency of the first and second AC voltages, and voltage comparison means for comparing the value of the first AC voltage with the value of the second AC voltage. The frequency control means controls the frequency of the first and second AC voltages in accordance with an output of the voltage comparison means.

According to still another aspect, the present invention relates to a vibrating actuator device including a vibrator, the device comprising first and second groups of energy transducers for generating mechanical vibration by applying electrical energy thereto, and vibrating in a first vibration mode by being excited by the first group of transducers and vibrating in a second vibration mode by being excited by the second group of transducers, driving control means for applying a first AC voltage to the first group of transducers and a second AC voltage, different from the first AC voltage only in its phase, to the second group of transducers, frequency control means for setting and changing a frequency of the first and second AC voltages, and current comparison means for comparing the value of a current flowing through the first group of transducers with the value of a current flowing through the second group of transducers. The frequency control means controls the frequency of the first and second AC voltages in accordance with an output of the current comparison means.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described with reference to FIGS. 1 through 8.

1. First Embodiment

Figure 1:
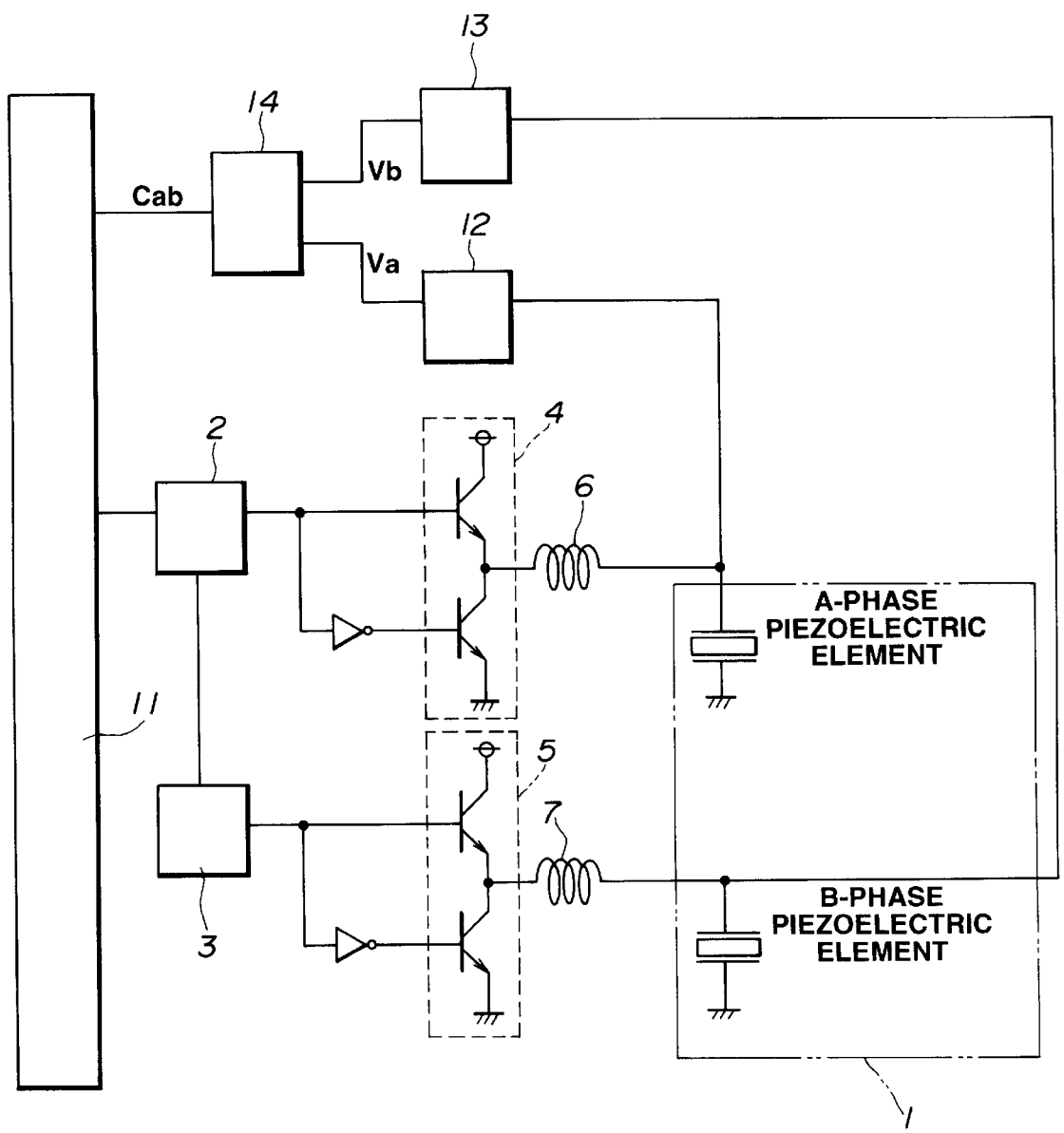
FIG. 1 is a schematic diagram illustrating the electrical configuration of driving control means of a vibrating motor according to first and second embodiments of the present invention.
Figure 2:
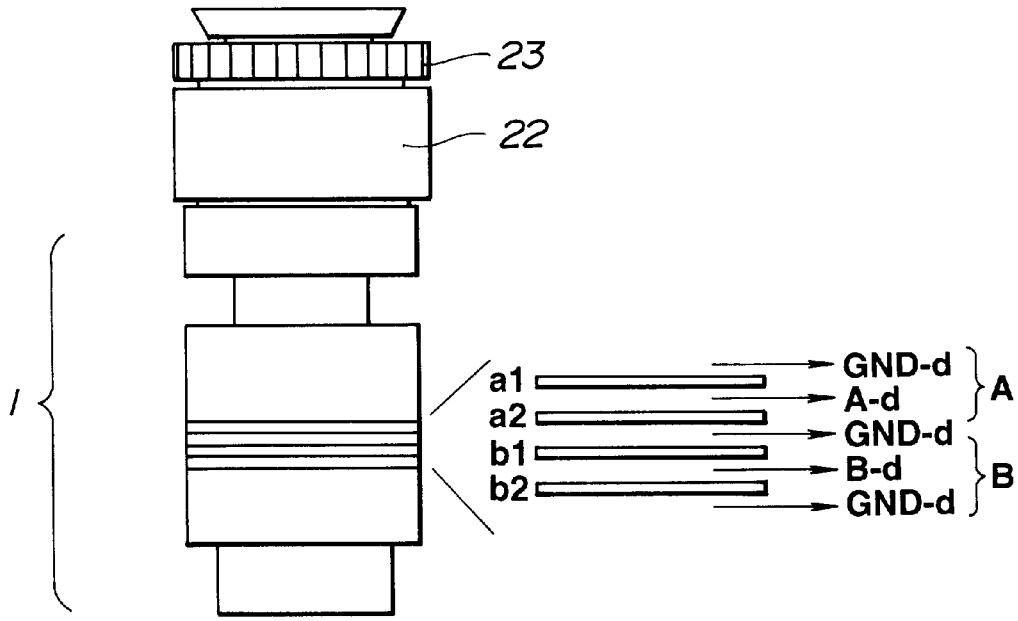
FIG. 2 is a schematic diagram illustrating the mechanical structure of a vibrating motor according to first, third and fourth embodiments of the present invention.

FIG. 2 illustrates the mechanical structure (the main body) of a vibrating motor according to a first embodiment of the present invention. FIG. 1 is a schematic diagram illustrating the electrical configuration of driving control means of the vibrating motor.

In FIG. 2, a vibrator 1 of the bar-shaped vibrating motor comprises circular piezoelectric elements a1, a2, b1 and b2, serving as electromechanical energy transducers, and electrode plates inserted in a large-diameter portion of the main body of the vibrator 1 which, comprises a thick metallic stepped cylindrical member. A cylindrical rotor 22 is in pressure contact with a distal-end surface of the vibrator 1 using a spring or the like, and an output gear 23 is fixed to the rotor 22.

The mechanical structure of the vibrating motor of the present embodiment differs from that of the above-described conventional vibrating motor in that the piezoelectric element for detecting vibration and the insulating sheet are absent. In addition, the vibrating motor of the present embodiment differs from the conventional vibrating motor in the following point.

That is, the vibrating motor of the present embodiment differs from the conventional vibrating motor in that the vibrator 1 is configured such that the resonance frequency of a first vibration mode (a standing wave) generated in the vibrator 1 by a first AC voltage applied to the A-phase piezoelectric elements is higher than the resonance frequency of a second vibration mode (a standing wave) generated in the vibrator I by a second AC voltage applied to the B-phase piezoelectric elements. In other words, the vibrator 1 of the vibrating motor of the present embodiment is configured so as to have a higher stiffness in the first vibration mode than in the second vibration mode.

Grounding electrodes GND-d are in tight contact with the outer surfaces of the piezoelectric element a1 and b2. A driving electrode A-d for applying a first AC voltage for driving is inserted between the piezoelectric elements a1 and a2. A grounding electrode GND-d is inserted between the piezoelectric elements a2 and b1. A driving electrode B-d for applying a second AC voltage for driving is inserted between the piezoelectric elements b1 and b2. That is, each of two pairs of piezoelectric elements, a1 and a2, and b1 and b2 is inserted between the grounding electrodes GND-d. An A-phase driving signal (to be described later) is applied to the piezoelectric elements a1 and a2 via the driving electrode A-d present therebetween, and a B-phase driving signal (to be described later) is applied to the piezoelectric elements b1 and b2 via the driving electrode B-d present therebetween.

FIG. 1 illustrates the schematic configuration of driving control means for applying the first and second AC voltages, serving as driving signals, to the A-phase piezoelectric elements a1 and a2 and the B-phase piezoelectric elements b1 and b2, respectively. In FIG. 1, a microprocessor 11 constitutes frequency control means for setting and changing the frequency of the AC voltages to be applied to the group of A-phase piezoelectric elements (in FIG. 1, two piezoelectric elements a1 and a2 are represented by a single element) and the group of B-phase piezoelectric elements (in FIG. 1, two piezoelectric elements b1 and b2 are represented by a single element). Oscillator 2 is a known voltage controlled oscillator (VCO) or the like for generating an AC signal having a frequency corresponding to an instruction signal generated from the microprocessor 11. Reference numeral 3 represents a known phase shifter for shifting the phase of the output signal of the oscillator 2 by a predetermined amount (for example, 90 degrees). Switching circuit 4 and 5 comprise, for example, push-pull amplifying circuits for amplifying the outputs of the oscillator 2 and the phase shifter 3 by switching the voltage of a high-voltage power supply 41 with the output of the oscillator 2 and the phase shifter 3, respectively. Matching coils 6 and 7 match the impedance of the driving control means side with the impedance of the vibrator side. A rectifying circuit 12 is connected to the driving electrode of the group of A-phase piezoelectric elements. A rectifying circuit 13 is connected to the driving electrode of the group of B-phase piezoelectric elements. A comparison circuit 14 is connected to output terminals of the rectifying circuits 12 and 13.

As shown in FIG. 1, the vibration control means of the vibrating motor of the present embodiment includes the comparison circuit 14 for detecting the difference between the value of the AC voltage applied to the group of A-phase piezoelectric elements and the value of the AC voltage applied to the group of B-phase piezoelectric elements. The microprocessor 11 receives the output of the comparison circuit 14 to detect the state of vibration of the vibrator 1, and controls the frequency of the AC voltages applied to the two groups of piezoelectric elements by referring to the state of the vibration.

Figure 3:
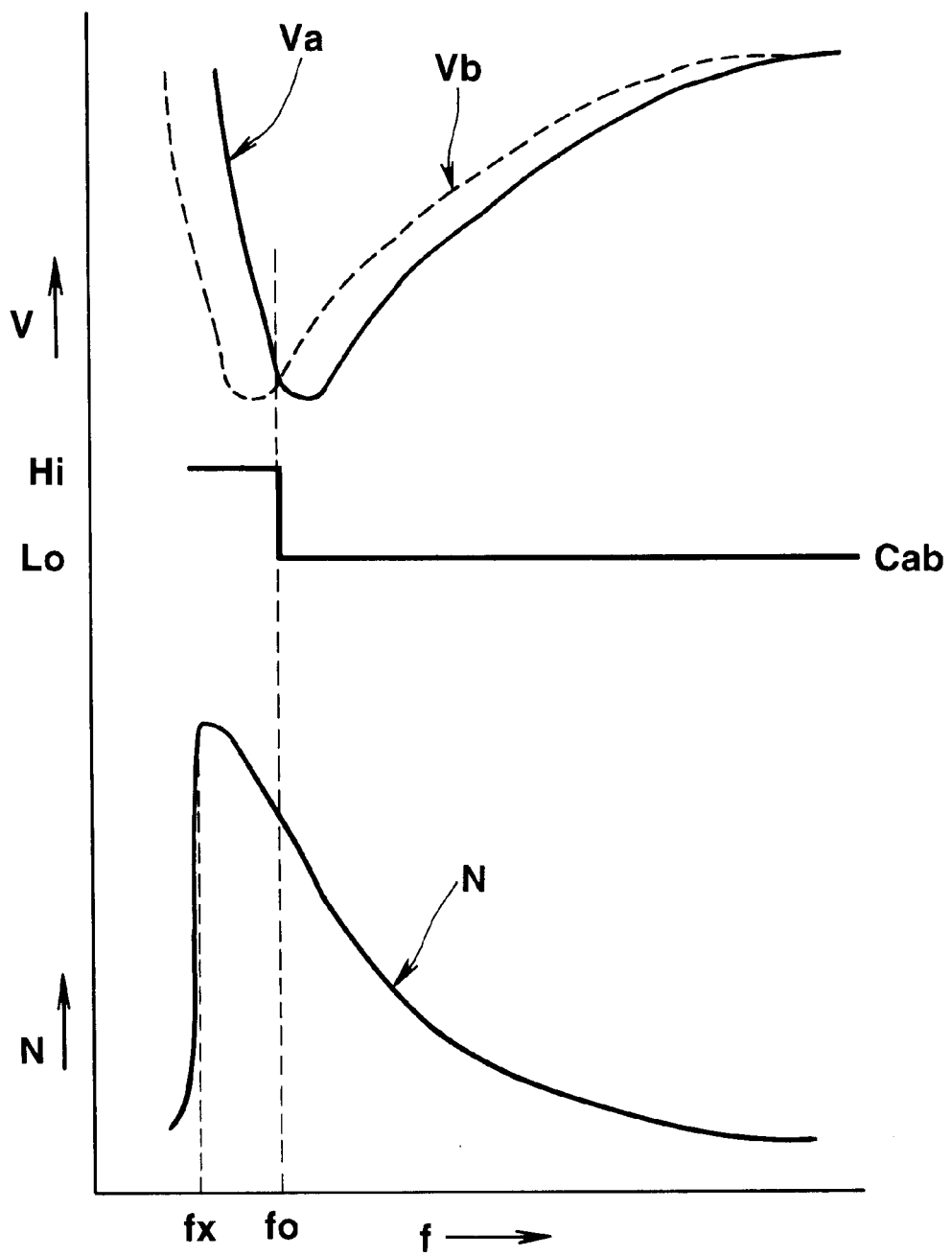
FIG. 3 is a graph illustrating a characteristic of the vibrating motor illustrated in FIG. 1, including output voltages of two rectifying circuits 12 and 13, and an output of a comparison circuit 14 of the driving control means in the first and second embodiments.

FIG. 3 is a graph illustrating the waveforms of signals at respective components shown in FIG. 1, and a characteristic of the vibrating motor.

In FIG. 3, $V_a$ represents the output voltage of the rectifying circuit 12, $V_b$ represents the output voltage of the rectifying circuit 13, $C_{ab}$ represents the output voltage of the comparison circuit 14, N represents the number of revolutions of the vibrating motor per unit time, the abscissa represents the frequency of the AC voltages applied to the piezoelectric elements, and the ordinate represents the number of revolutions of the vibrating motor and the output voltages of the the above-described circuits, as shown.

In general, as can be understood from FIG. 3, the vibrating motor rotates at a low speed when the frequency of the applied AC voltages is much higher than the resonance frequency $f_0$ of the vibrator. The number of revolutions of the vibrating motor gradually increases as the frequency of th applied AC voltage is gradually reduced to the resonance or natural frequency, and abruptly decreases when the frequency of the AC voltage reaches a specific frequency $f_x$ that is slightly lower than the resonance frequency $f_0$ of the vibrator.

Accordingly, in order to control the vibrating motor so as not to produce an abrupt decrease in the number of revolutions, it is necessary to precisely detect the state of vibration of the vibrator (particularly, the state of vibration in the vicinity of the resonant state of the vibrator), and to control the frequency of the AC voltages applied to the vibrator based on the result of the detection.

In a conventional vibrating motor, the state of vibration of the vibrator is detected by the piezoelectric element provided for detecting the state of vibration. In the vibrating motor of the present embodiment, however, as shown in FIG. 1, the state of vibration of the vibrator is detected by the two rectifying circuits 12 and 13, and the comparison circuit 14 for comparing the outputs of these rectifying circuits.

In the vibrating motor of the present embodiment, as shown in FIG. 3, the output voltages $V_a$ and $V_b$ of the rectifying circuits 12 and 13, respectively, are represented by curves, each having a minimum value in the vicinity of the resonance frequency of the vibrator 1. As described above, the vibrator of the vibrating motor of the present embodiment is configured such that the resonace frequency of the A-phase piezoelectric elements (i.e., in the first vibration mode) (a standing wave) is higher than the resonance frequency of the B-phase piezoelectric elements (i.e., in the second vibration mode) (a standing wave). Hence, the output voltage $V_a$ of the rectifying circuit 12 is lower than the output voltage $V_b$ of the rectifying circuit 13 when the speed of the vibrating motor is low immediately after having been started (i.e., when the frequency of the driving AC voltages is higher than the resonance frequency $f_0$ of the vibrator). Accordingly, the output $C_{ab}$ of the comparison circuit 14 assumes "Low".

When the frequency of the applied AC voltages is reduced in order to increase the speed of the vibrating motor toward a steady-state revolution speed, the value of $V_a$ first increases after passing through a minumum value. As a result, the relationship of $V_a<V_b$ changes to $V_a>V_b$. At the same time, the output $C_{ab}$ of the comparison circuit 14 changes from "Low" to "Hi". The microprocessor 11 controls the vibrating motor so as not to produce the above-described abrupt decrease in the number of revolutions by controlling the frequency of the applied AC voltages so as not to become less than the value when the output $C_{ab}$ of the comparison circuit 14 has changed from "Low" to "Hi". It is thereby possible to maintain the vibrating motor in a state of steady-state revolution.

If the frequency of the applied AC voltages is set to a frequency slightly higher than the frequency where the relationship changes to $V_a > V_b$, in order to maintain the relationship could be $V_a < V_b$, the relationship change to $V_a > V_b$ when the resonance frequency of the vibrator of the vibrating motor has increased due to a change in the ambient temperature, a change in the load, or the like. As a result, the output $C_{ab}$ of the comparison circuit 14 also would change, and the microprocessor 11 could control the vibrating motor so as not to produce an abrupt change in the number of revolutions by changing the frequency of the driving AC voltages toward a higher value in accordance with the change in the output $C_{ab}$.

As described above, in the vibrating motor of the present embodiment, for example, by configuring the vibrator so as to have a higher resonance frequency in the second vibration mode than in the first vibration mode (the resonace frequencies in the first and second vibration modes are set to values higher than the resonance frequency of composite vibration obtained by driving the A-phase and B-phase piezoelectric elements, i.e., the oscillatory wave for generating a driving force by the vibration of the vibrator), and by providing means for comparing the value of the A-phase driving voltage with the value of the B-phase driving voltage, it is possible to realize an improved vibrating motor which does not require the coventional piezoelectric element for detecting vibration and which can be manufactured with a lower cost than in the case of the conventional vibrating motor.

2. Second Embodiment

Figure 4:
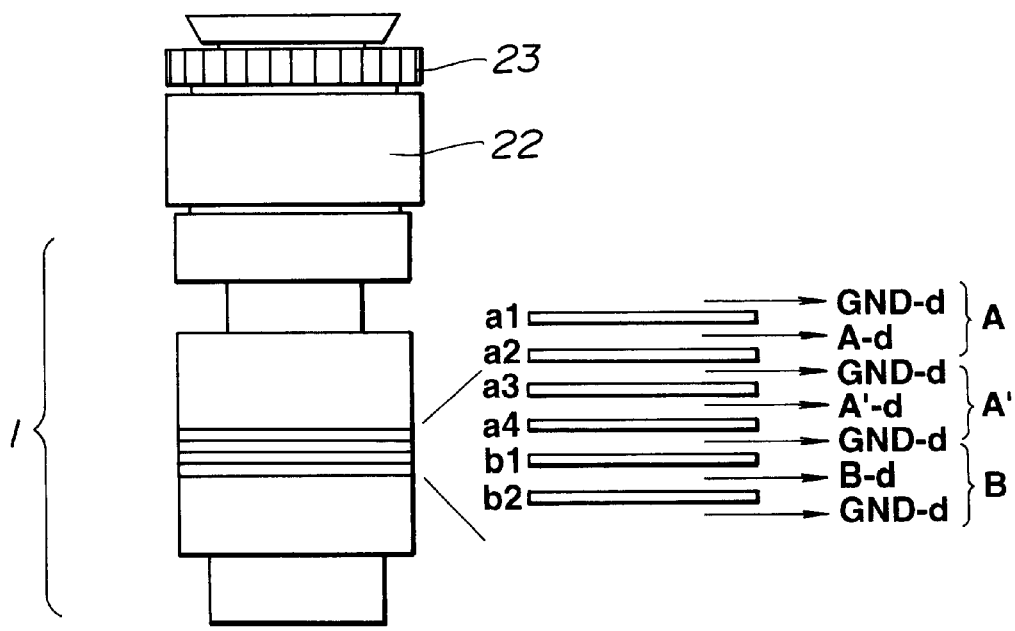
FIG. 4 is a schematic diagram illustrating the mechanical structure of the vibrating motor according to the second embodiment.

FIG. 4 illustrates the mechanical structure of a vibrating motor according to a second embodiment of the present invention. The vibrating motor of the second embodiment has the same electrical configuration as that of the vibrating motor of the first embodiment, and the driving control means shown in FIG. 1 is al so used in the second embodiment.

The mechanical structure of the vibrating motor of the second embodiment has a feature in that the number of A-phase piezoelectric elements is greater than the number of B-phase piezoelectric elements.

A vibrator of the vibrating motor of the second embodiment shown in FIG. 4 includes four A-phase piezoelectric elements a1–a4, and two B-phase piezoelectric elements b1 and b2. A driving electrode A-d is provided between the piezoelectric elements a1 and a2, a driving electrode A'-d is provided between the piezoelectric elements a3 and a4, and a driving electrode B-d is provided between the piezoelectric elements b1 and b2. Grounding electrodes GND-d are provided on the outer side of the piezoelectric element a1, between the piezoelectric elements a2 and a3, between the piezoelectric elements a4 and b1, and on the outer side of the piezoelectric element b2.

According to such a configuration in which the number of the A-phase piezoelectric elements differs from the number of the B-phase piezoelectric elements, it is possible to provide different characteristics of vibration for a first vibration mode (a standing wave) and a second vibration mode (a standing wave). As a result, it is possible to provide different characteristics of the output voltage for the two rectifying circuits 12 and 13 provided in the driving control means. Hence, a change in the state of vibration of the vibrator can be easily detected.

Figure 5:
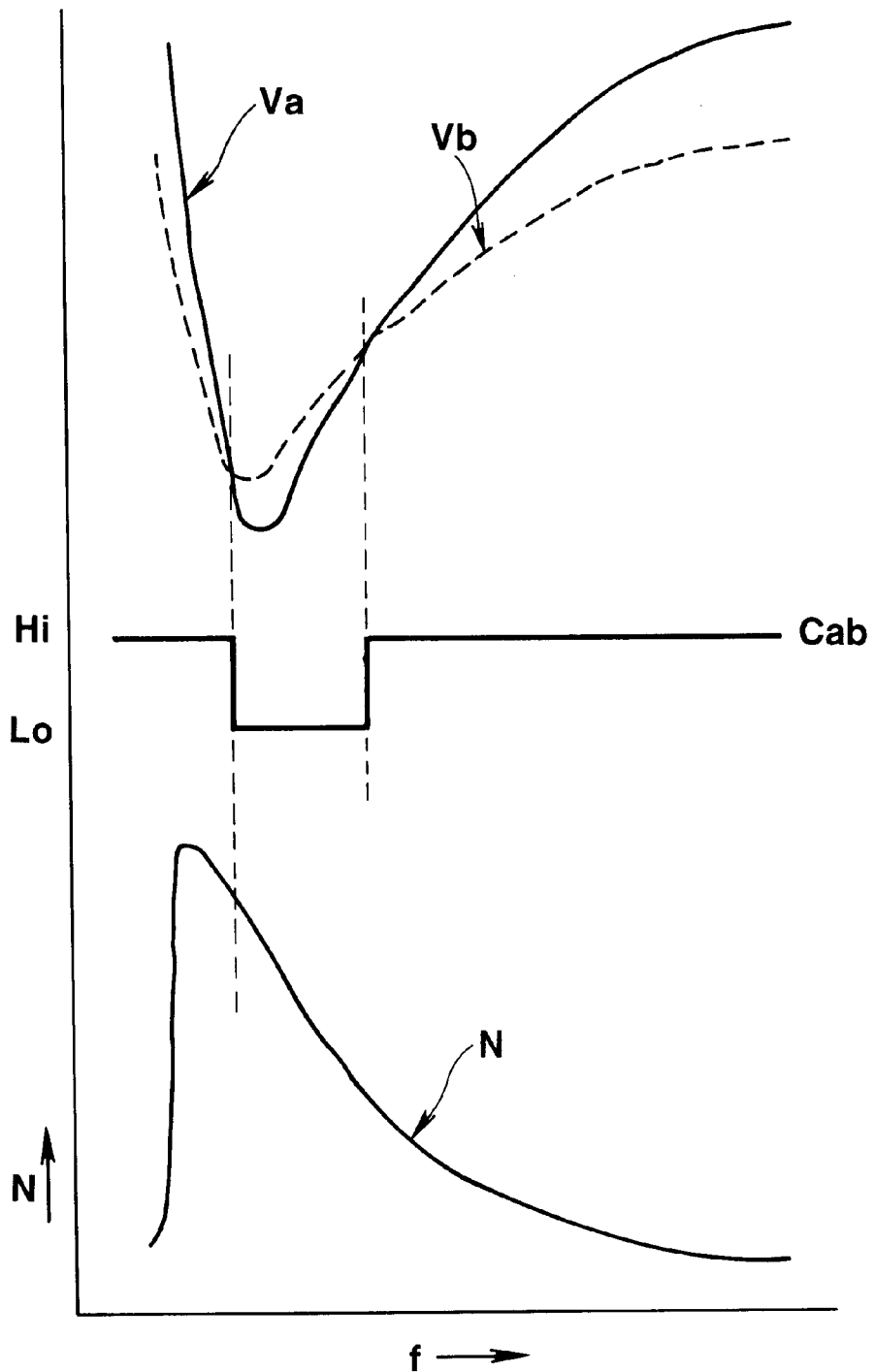
FIG. 5 is a graph illustrating a characteristic of the vibrating motor, output voltages of two rectifying circuits, and an output of the comparison circuit of the driving control means in the second embodiment.

A description will now be provided of the operation of the driving control means of the vibrating motor according to the second embodiment with reference to FIG. 5.

When starting the vibrating motor, the frequency of the applied AC voltage is swept from a high value to a low value. In the vibrating motor of the second embodiment, since the number of the A-phase piezoelectric elements is greater than the number of the B-phase piezoelectric elements, the capacitance of the A-phase piezoelectric elements is greater than the capacitance of the B-phase piezoelectric elements. Accordingly, in a state of transient rotation after staring the vibrating motor, the frequency of the applied AC voltages is considerably higher than the resonance frequency of the vibrator. Hence, as shown in FIG. 5, the output voltage $V_a$ of the rectifying circuit 12 is higher than the output voltage $V_b$ of the rectifying circuit 13, and the output $C_{ab}$ of the comparison circuit 14 assumes "Hi".

As the frequency of the applied AC voltages is decreased to approach the resonant frequency, in order to increase the number of revolutions (speed) of the vibrating motor, the output voltage $V_a$ of the rectifying circuit 12 abruptly decreases because the resonance admittance of the A-phase piezoelectric elements is large, to provide a state of $V_a < V_b$, and the output $C_{ab}$ of the comparison circuit 14 changes from "Hi" to "Low". When the frequency of the applied AC voltages approaches the resonance frequency by further lowering the frequency, the state of $V_a > V_b$ is again obtained, and the output $C_{ab}$ of the comparison circuit 14 changes from "Low" to "Hi". Accordingly, the microprocessor 11 controls the vibrating motor so as not to produce the above-described abrupt decrease in the number of revolutions by providing an instruction signal not to lower the frequency of the applied AC voltages from the value at that time.

If the frequency of the applied AC voltages is set to a frequency slightly higher than the frequency where the relationship changes to $V_a > V_b$ in order to maintain the relationship could be $V_a < V_b$, the relationship change to $V_a > V_b$ when the resonance frequency of the vibrator of the vibrating motor increases due to a change in the ambient temperature, a change in the load, or the like. As a result, the output $C_{ab}$ of the comparison circuit 14 also would change, and the microprocessor 11 could control the vibrating motor so as not to produce an abrupt change in the number of revolutions by changing the frequency of the driving AC voltages toward a higher value in accordance with the change in the output $C_{ab}$.

According to the second embodiment, the value of the A-phase driving voltage can be precisely compared with the value of the B-phase driving voltage even without designing the main body of the vibrator so as to have different rigidities in the first vibration mode and the second vibration mode as in the first embodiment.

Although in the present embodiment, different vibration characteristics (or vibration admittances) are provided for the first vibration mode and the second vibration mode by providing different numbers of A-phase piezoelectric elements and B-phase piezoelectric elements, different vibration characteristics also may be provided for the first vibration mode and the second vibration mode by shifting the position of the A-phase piezoelectric elements and the position of the B-phase piezoelectric elements mounted in the vibrator (with respect to the axial direction of the vibrator) with each other.

3. Third Embodiment

Figure 6:
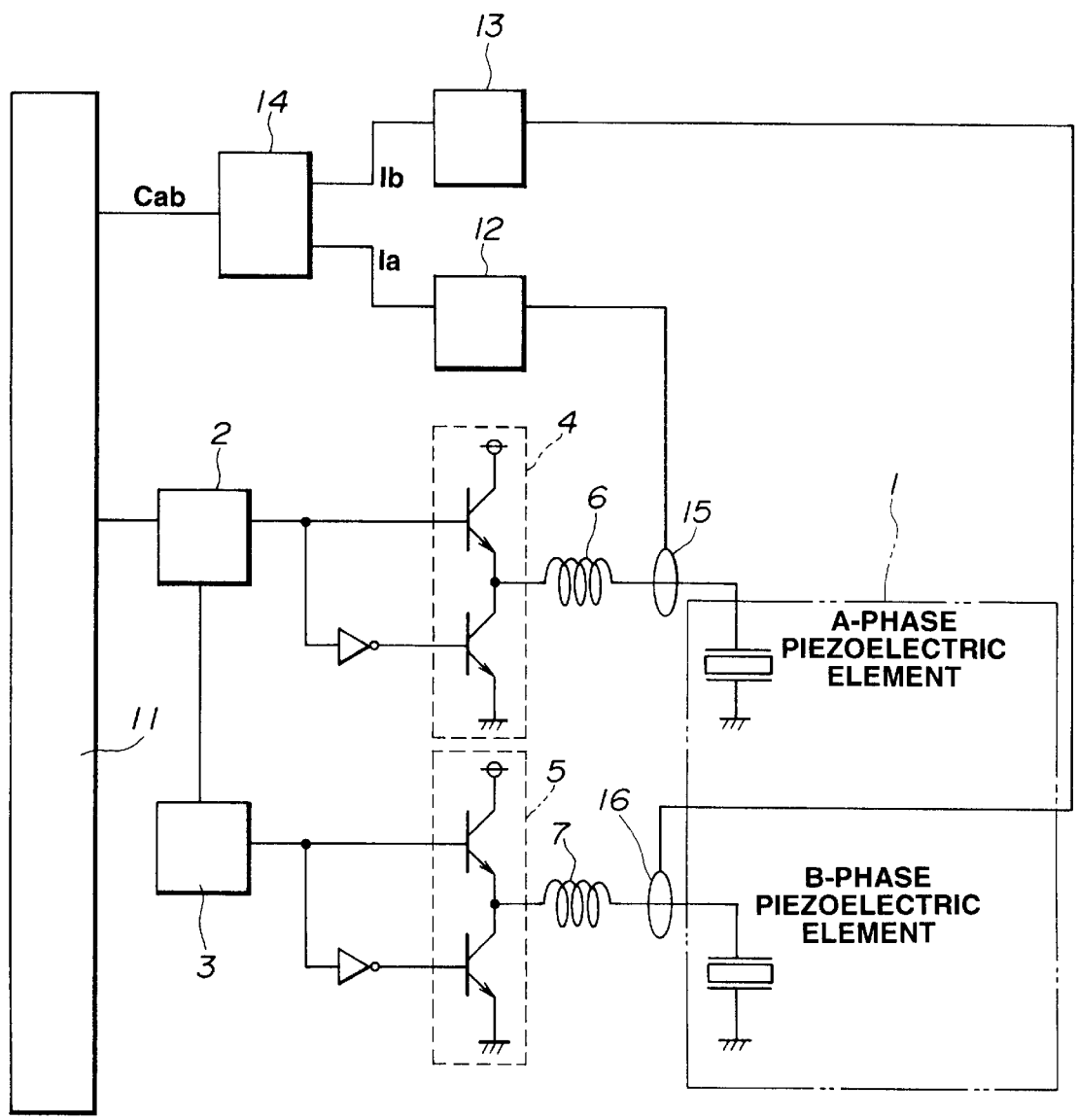
FIG. 6 is a schematic diagram illustrating the electrical configuration of the vibrating motor according to the third embodiment.

FIG. 6 illustrates the electrical configuration of driving control means of a vibrating motor according to a third embodiment of the present invention. The mechanical structure of the vibrating motor of the third embodiment is the same as in the first embodiment. That is, the vibrator of the vibrating motor of the third embodiment is configured such that the resonance frequency in the first vibration mode (standing-wave vibration produced by the A-phase piezoelectric elements) is higher than the resonance frequency in the second vibration mode (standing-wave vibration produced by the A-phase piezoelectric elements), i.e., the stiffness in the first vibration mode is greater than the stiffness in the second vibration mode. Hence, FIG. 2 illustrates a mechanical structure of the vibrating motor of the third embodiment.

The driving control means of the vibrating motor of the third embodiment has a feature different from the first embodiment in that the vibration state of the vibrator is detected by detecting the value of a current flowing through the A-phase piezoelectric elements and the value of a current flowing through the B-phase piezoelectric elements caused by the AC voltages applied to the two groups of piezoelectric elements.

In FIG. 6, reference numerals 15 and 16 represent current detection devices, such as Hall elements, current probes, inductors or the like. Other components and control methods therefor are substantially the same as those described with reference to FIG. 1. That is, reference numerals 12 and 13 represent rectifying circuits, and reference numeral 14 represents a current comparison circuit. The current comparison circuit 14 compares the output current $I_a$ of the rectifying circuit 12 with the output current $I_b$ of the rectifying circuit 13, and outputs a "Hi" or "Low" output $C_{ab}$. The microprocessor 11 changes an instruction value for the frequency of the AC voltages to be applied to the piezoelectric elements in accordance with the output $C_{ab}$.

Figure 7:
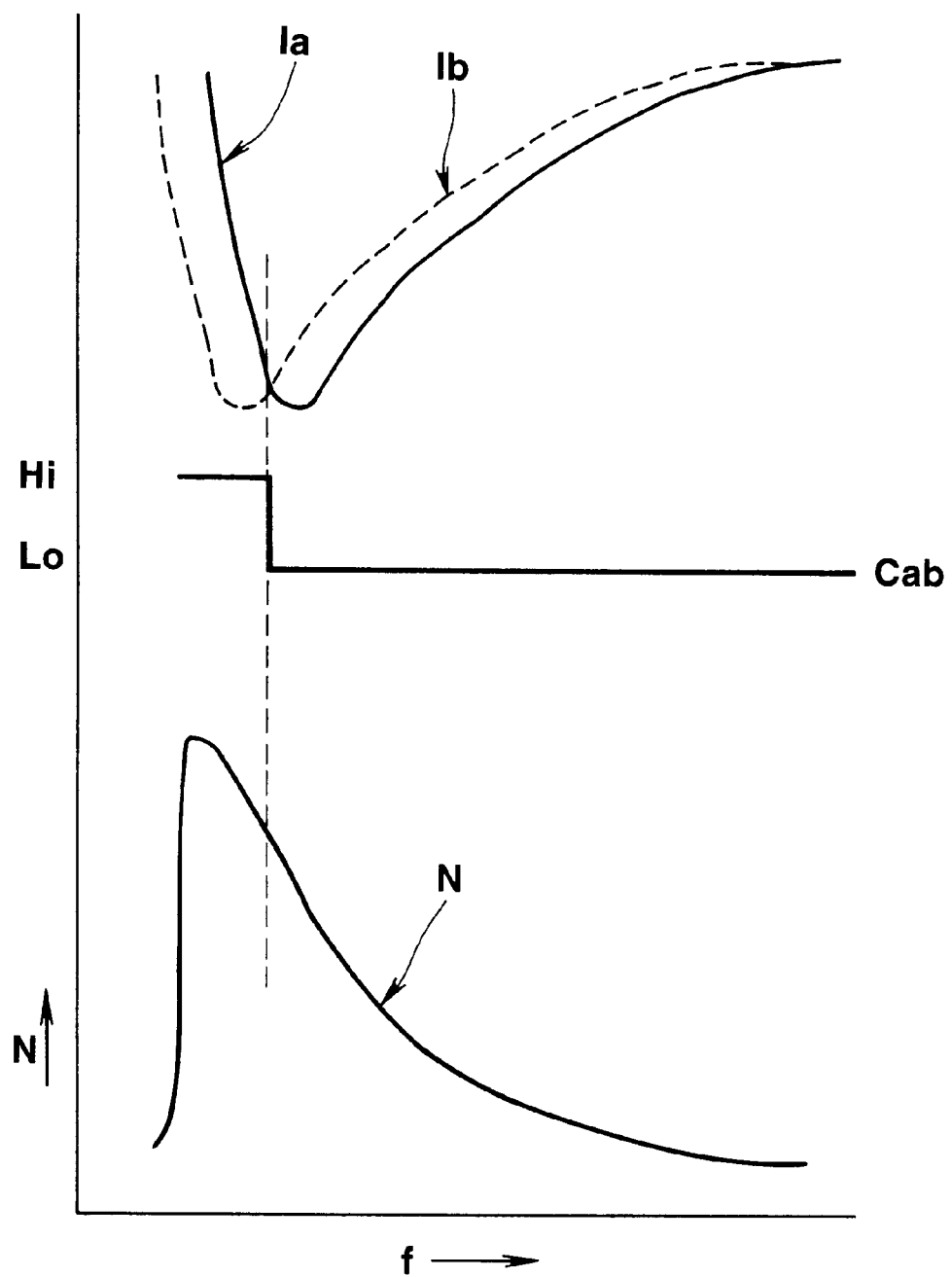
FIG. 7 is a graph illustrating a characteristic of the vibrating motor, output voltages of two rectifying circuits, and an output of a comparison circuit shown in FIG. 6.

FIG. 7 is a graph illustrating, as in FIGS. 3 and 5, the number of revolutions N of the rotor of the vibrating motor (per unit time), and the output currents of the rectifying circuits 12 and 13 and the output $C_{ab}$ of the comparison circuit 14 (the ordinate) as a function of the frequency of vibration of the vibrator of the vibrating motor, and the frequency of the AC voltages applied to the piezoelectric elements (the abscissa), respectively.

In the vibrating motor of the present embodiment, as shown in FIG. 7, the output currents $I_a$ and $I_b$ of the rectifying circuits 12 and 13, respectively, are represented by curves, each having a minimum value in the vicinity of the resonance frequency (at a resonance frequency in each mode higher than the resonance frequency) of the vibrator 1. As described above, the vibrator of the vibrating motor of the present embodiment is configured such that the resonace frequency of the A-phase piezoelectric elements (i.e., in the first vibration mode) is higher than the resonance frequency of the B-phase piezoelectric elements (i.e., in the second vibration mode). Hence, the output current $I_a$ of the rectifying circuit 12 is lower than the output current $I_b$ of the rectifying circuit 13 when the speed of the vibrating motor is low immediately after having been started (i.e., when the frequency of the driving AC voltages is higher than the resonance frequency $f_0$ of the vibrator). Accordingly, the output $C_{ab}$ of the comparison circuit 14 assumes "Low".

When the frequency of the applied AC voltage is reduced toward the resonance frequency in order to increase the speed of the vibrating motor toward a steady-state revolution speed, the value of $I_a$ first increases after passing through a minumum value. As a result, the relationship of $I_a<I_b$ changes to to $I_a>I_b$. At the same time, the output $C_{ab}$ of the comparison circuit 14 changes from "Low" to "Hi". The microprocessor 11 controls the vibrating motor so as not to produce the above-described abrupt decrease in the number of revolutions by controlling the frequency of the applied AC voltages so as not to become less than the value when the output $C_{ab}$ of the comparison circuit 14 is changed from "Low" to "Hi". It is thereby possible to maintain the vibrating motor in a state of steady-state revolution.

If the frequency of the applied AC voltages is set to a frequency slightly higher than the frequency where the relationship changes to $I_a>I_b$ in order to maintain the relationship to be $I_a<I_b$, the relationship could change to $I_a>I_b$ when the resonance frequency of the vibrator of the vibrating motor increases due to a change in the ambient temperature, a change in the load, or the like. As a result, the output $C_{ab}$ of the comparison circuit 14 would also change, and the microprocessor 11 could control the vibrating motor so as not to produce an abrupt change in the number of revolutions by changing the frequency of the driving AC voltages toward a higher value in accordance with the change in the output $C_{ab}$.

If the current detection devices 15 and 16 are used as in the configuration of the present embodiment, these devices need not be directly connected to the main circuitry of the vibrating motor as in the case of voltage detection devices. Hence, the state of vibration of the vibrator can be precisely detected without influencing the driving signals of the vibrating motor.

4. Fourth Embodiment

Figure 8:
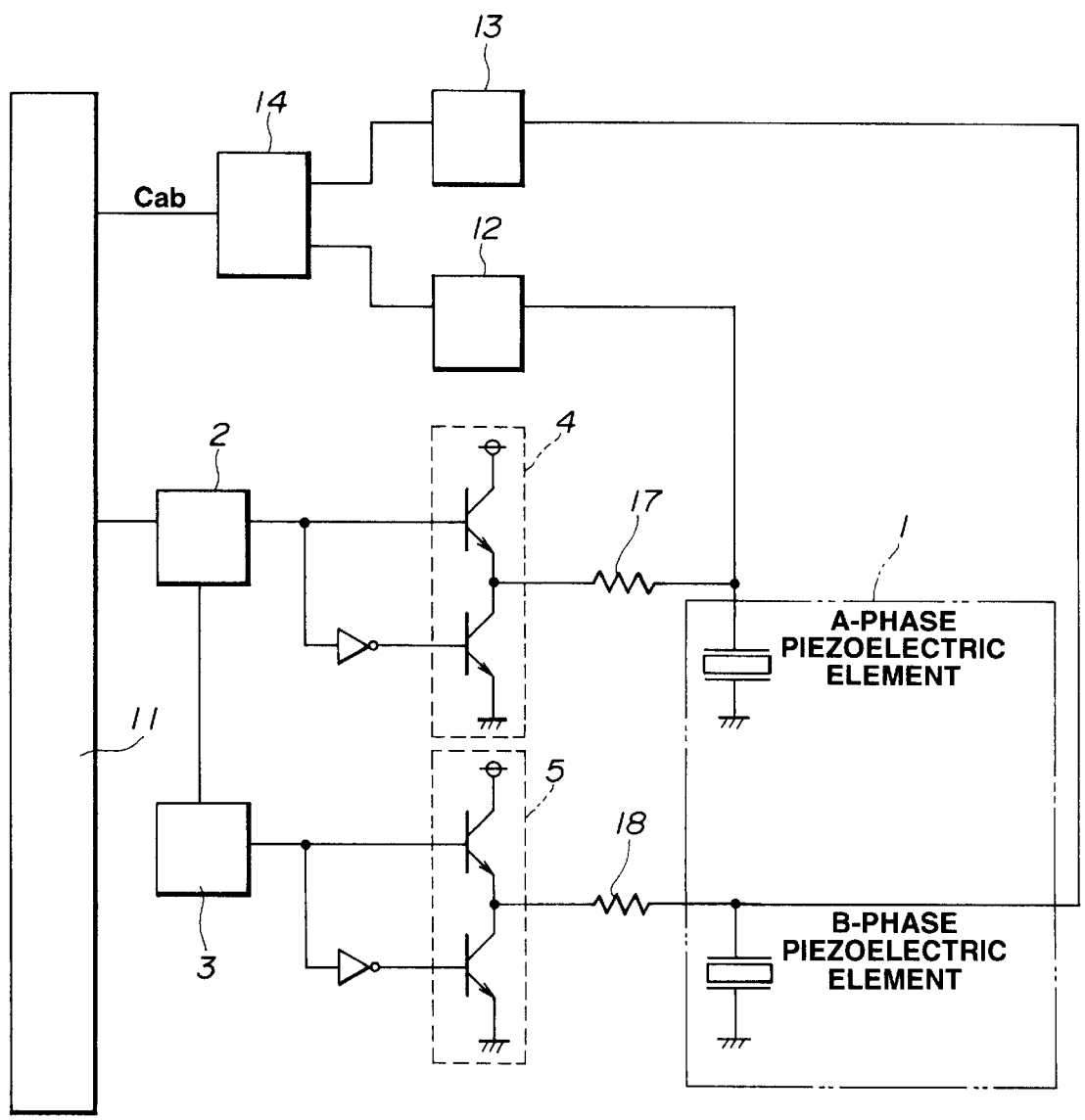
FIG. 8 is a schematic diagram illustrating the electrical configuration of the vibrating motor according to the fourth embodiment.
Figure 9:
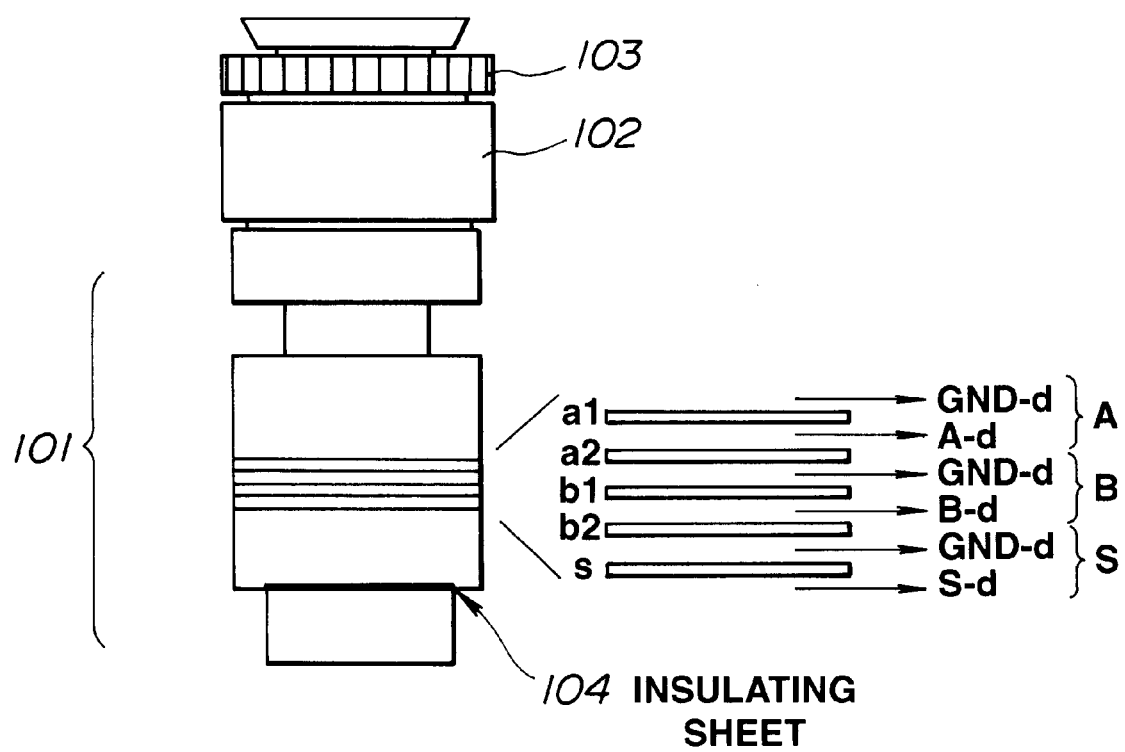
FIG. 9 is a schematic diagram illustrating the mechanical structure of a conventional bar-shaped vibrating motor.
Figure 10:
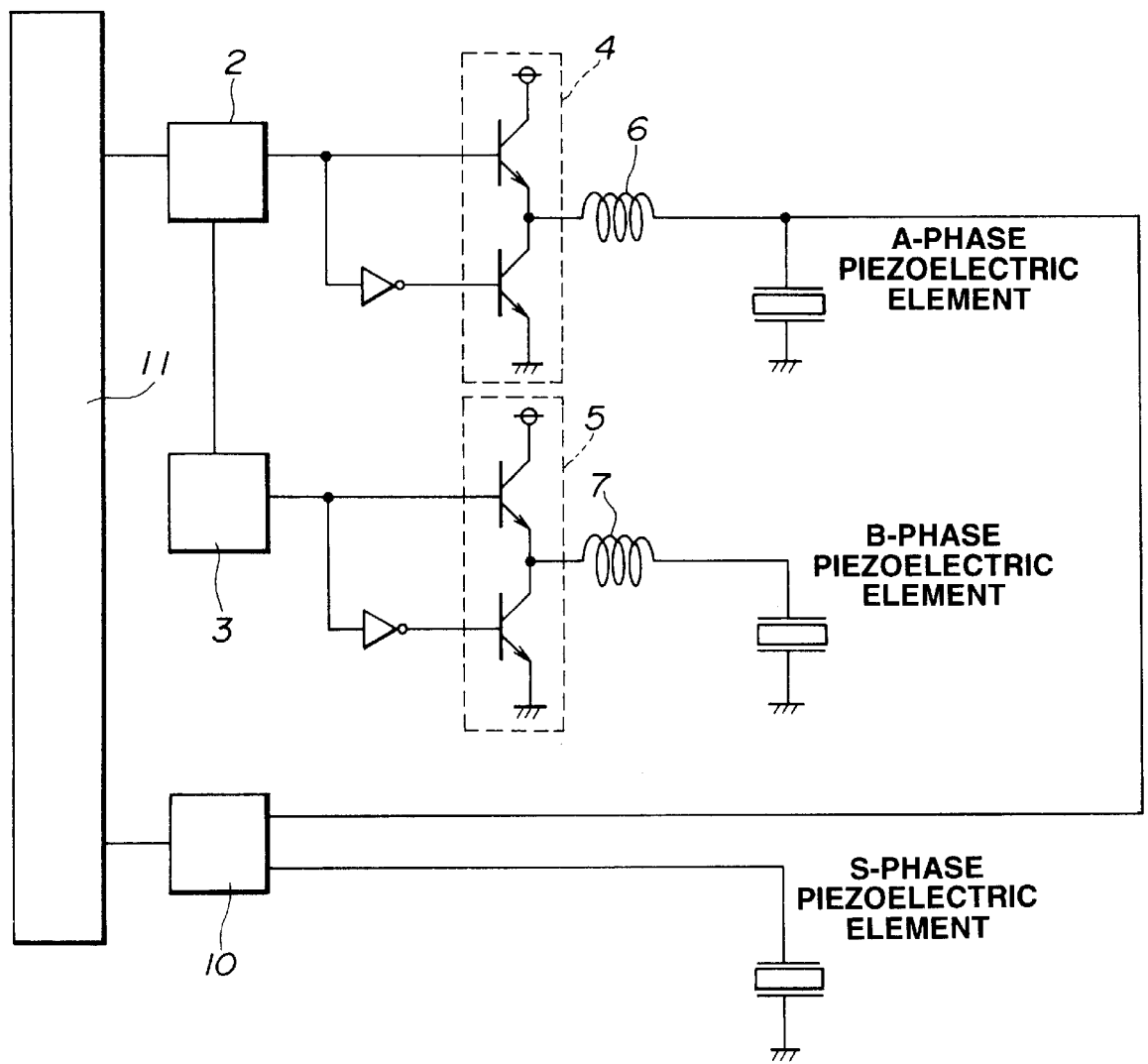
FIG. 10 is a schematic diagram illustrating the electrical configuration of the conventional known bar-shaped vibrating motor.

FIG. 8 illustrates the electrical configuration of driving control means of a vibrating motor according to a fourth embodiment of the present invention. The mechanical structure of the main body of the vibrating motor of the fourth embodiment is the same as in the first embodiment. That is, a vibrator is configured such that the stiffness (rigidity) in a first vibration mode (standing-wave vibration produced by a first AC voltage applied to A-phase piezoelectric elements) is greater than the stiffness in a second vibration mode (standing-wave vibration produced by a second AC voltage applied to B-phase piezoelectric elements).

The configuration of the driving control means of the vibrating motor of the fourth embodiment differs from the configuration shown in FIG. 1 in that resistors 17 and 18, serving as impedance elements, are connected between switching circuits 4 and 5, and A-phase piezoelectric elements and B-phase piezoelectric elements, respectively, and the matching coils are absent. Other impedance elements may be connected instead of the resistors 17 and 18.

If the impedance elements are connected between output terminals of the switching circuits 4 and 5, and the piezoelectric elements as in the first embodiment, the values of the voltage drops at input connecting points of rectifying circuits 12 and 13 would change depending on the impedance characteristics of the respective piezoelectric elements. Hence, changes in the outputs of the rectifying circuits 12 and 13 can be easily detected, and therefore the state of vibration of each group of piezoelectric elements can be precisely detected.

Since the driving control means of the fourth embodiment is configured by the same components as those shown in FIG. 1, except the impedance elements, an explanation of the configuration and the operation of the circuitry will be omitted.

Although in the above-described embodiments, the present invention is applied to a bar-shaped vibrating motor, it is apparent that the present invention is not limited to such a vibrating motor, but may al so be applied to any vibrating motor having a vibrator vibrating in at least two vibrating modes.

Although in the above-described embodiments, a comparison circuit performs comparison between $V_a$ and $V_b$, or between $I_a$ and $I_b$, a configuration may al so be adopted in which it is determined if the difference $V_a-V_b$ or $I_a-I_b$ has reached a predetermined value C.

The individual components shown in outline in the drawings are all well known in the vibrating actuator device arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A vibrating actuator device for obtaining a driving force by exciting a vibrator by applying driving frequency signals to a first electromechanical energy transducer unit and a second electromechanical energy transducer unit, a phase of the drive frequency signal applied to the first electromechanical energy transducer unit being different from a phase of the drive frequency signal applied to the second electromechanical energy transducer unit, said device comprising:

a drive signal forming circuit which forms the drive frequency signals applied to the first electromechanical energy transducer unit and the second electromechanical energy transducer unit;

first detection means for detecting a voltage level of the drive frequency signal applied to the first electromechanical energy transducer unit;

second detection means for detecting a voltage level of the drive frequency signal applied to the second electromechanical energy transducer unit; and a determination circuit, connected to said first and second detection means, that determines a driving state of the device based on a difference between a voltage level of the driving frequency signal detected by said first detection means and a voltage level of the driving frequency signal detected by said second detection means.

2. A vibrating actuator device for obtaining a driving force by exciting a vibrator by applying driving frequency signals to a first electromechanical energy transducer unit and a second electromechanical energy transducer unit, a phase of the drive frequency signal applied to the first electromechanical energy transducer unit being different from a phase of the drive frequency signal applied to the second electromechanical energy transducer unit, said device comprising:

a drive signal forming circuit which forms the drive frequency signals; and a frequency control circuit which controls a frequency of the driving frequency signals based on a difference between a voltage level of the frequency signal applied to the first energy transducer unit and a voltage level of the frequency signal applied to the second energy transducer unit.

3. A device according to claim 1, wherein frequency characteristics of a vibration mode when applying the driving frequency signal to the first electromechanical energy transducer unit differ from frequency characteristics of a vibration mode when applying the driving frequency signal to the second electromechanical energy transducer unit.

4. A device according to claim 2, wherein frequency characteristics of a vibration mode when applying the driving frequency signal to the first electromechanical energy transducer unit differ from frequency characteristics of a vibration mode when applying the driving frequency signal to the second electromechanical energy transducer unit.

5. A device according to claim 3, wherein the vibration mode is a standing-wave mode, and wherein a resonance frequency of the first electromechanical energy transducer unit in the standing-wave mode differs from a resonance frequency of the second electromechanical energy transducer unit in the standing-wave mode.

6. A device according to claim 4, wherein the vibration mode is a standing-wave mode, and wherein a resonance frequency of the first electromechanical energy transducer unit in the standing-wave mode differs from a resonance frequency of the second electromechanical energy transducer unit in the standing-wave mode.

7. A vibrating actuator device comprising:

a vibrator, comprising first and second groups of energy transducers for generating mechanical vibration by applying electrical energy thereto, and vibrating in a first vibration mode by being excited by the first group of transducers and vibrating in a second vibration mode by being excited by the second group of transducers;

driving control means for applying a first frequency voltage to the first group of transducers and a second frequency voltage, having the same nominal voltage level and different from the first frequency voltage only in its phase, to the second group of transducers;

frequency control means for setting and changing a frequency of the first and second frequency voltages; and voltage comparison means for comparing the actual voltage level of the first frequency voltage with the actual voltage level of the second frequency voltage, wherein said frequency control means controls the frequency of the first and second frequency voltages in accordance with an output of said voltage comparison means.

8. A vibrating actuator device comprising:

a vibrator, comprising first and second groups of energy transducers for generating mechanical vibration by applying electrical energy thereto;

driving control means for applying a first frequency voltage to the first group of transducers and a second frequency voltage, different from the first frequency voltage only in its phase, to the second group of transducers;

detection means for detecting the value of currents flowing through the first group of transducers and the second group of transducers; and a determination circuit, connected to said detection means, that determines a driving state of the device based on a difference between the value of a current flowing through the first group of transducers and the value of a current flowing through the second group of transducers.

9. A device according to claim 7, wherein said vibrator is configured so that a natural frequency in the first vibration mode differs from a natural frequency in the second vibration mode.

10. A device according to claim 8, wherein the mechanical vibration generated in said vibration member is composed of a resonance frequency generated by the first frequency voltage applied to said first group of transducers that is different from a resonance frequency generated by the second frequency voltage applied to said second group of transducers.

11. A device according to claim 8, further comprising a control circuit that controls the frequency of the first and second frequency voltages in accordance with a driving state determined by said determination circuit.

* * * * *

UNITED STATES PATENT AND TRADEMARK OFFICE
CERTIFICATE OF CORRECTION

PATENT NO. : 5,920,144

DATED : July 6, 1999

INVENTOR(S) : AKIO ATSUTA

It is certified that error appears in the above-identified patent and that said Letters Patent is hereby corrected as shown below:

Column 1

Line 5, "vibrating" should read --vibration--.
    Line 6, "oscillatory-wave-motor)." should read --oscillatory-wave motor).--
    Line 11, "wave-motor)," should read --wave motor),--.
    Line 15, "a" should read --as a--.
    Line 28, "vibrator" should read --a vibrator--.

Column 2

Line 4, "elements." should read --element s.--
    Line 14, "the-other" should read --the other--.

Column 3

Line 36, "device" should read --device including--.

Column 4

Line 19, "FIG.1 ," should read --FIG. 1,--.
    Line 60, "1 which," should read --1, which--.

UNITED STATES PATENT AND TRADEMARK OFFICE
CERTIFICATE OF CORRECTION

PATENT NO. : 5,920,144

DATED : July 6, 1999

INVENTOR(S) : AKIO ATSUTA

It is certified that error appears in the above-identified patent and that said Letters Patent is hereby corrected as shown below:

Column 5

Line 2, "ment" should read --ments--.
    Line 12, "vibrator I" should read --vibrator 1--.
    Line 18, "element" should read --elements--.
    Line 50, "circuit" should read --circuits--.

Column 6

Line 25, "th" should read --the--.

Column 7

Line 13, "could" should read --to--; and "change" should read --could change--.
    Line 44, "al so" should read --also--.

Column 8

Line 42, "could" should read --to--; and "change" should read --could change--.

UNITED STATES PATENT AND TRADEMARK OFFICE
CERTIFICATE OF CORRECTION

PATENT NO. : 5,920,144

DATED : July 6, 1999

INVENTOR(S) : AKIO ATSUTA

It is certified that error appears in the above-identified patent and that said Letters Patent is hereby corrected as shown below:

Column 10

Line 4, "· to" should rad --to--.

Column 11

Line 4, "al so" should read --also--.
    Line 9, "al so" should read --also--.

Signed and Sealed this

Twenty-third Day of May, 2000

Attest:

Attesting Officer

Q. TODD DICKINSON

Director of Patents and Trademarks